(12) United States Patent
Kim

(10) Patent No.: US 10,845,896 B2
(45) Date of Patent: Nov. 24, 2020

(54) STYLUS PEN AND METHOD FOR MANUFACTURING THE SAME

(71) Applicant: HiDeep Inc., Seongnam-si (KR)

(72) Inventor: Seyeob Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 108 days.

(21) Appl. No.: 15/984,492

(22) Filed: May 21, 2018

(65) Prior Publication Data
US 2019/0129524 A1 May 2, 2019

(30) Foreign Application Priority Data

Oct. 27, 2017 (KR) .......................... 10-2017-0141345

(51) Int. Cl.
*G06F 3/0354* (2013.01)

(52) U.S. Cl.
CPC ................................ *G06F 3/03545* (2013.01)

(58) Field of Classification Search
CPC ............................. G06F 3/03545; G06F 3/0383
See application file for complete search history.

(56) References Cited

U.S. PATENT DOCUMENTS

| 9,298,285 B2 | 3/2016 | Mohindra et al. |
| 2017/0008332 A1* | 1/2017 | Mattis ................... B43K 29/00 |
| 2017/0199590 A1* | 7/2017 | Lien ..................... G06F 3/03545 |
| 2017/0300138 A1 | 10/2017 | Qian et al. |

FOREIGN PATENT DOCUMENTS

| JP | 06-301465 | 10/1994 |
| JP | 2014-081793 | 5/2014 |
| WO | 2013-057862 | 4/2013 |
| WO | 2014-042194 | 3/2014 |
| WO | 2016-052051 | 4/2016 |

* cited by examiner

*Primary Examiner* — Yaron Cohen
(74) *Attorney, Agent, or Firm* — Lex IP Meister, PLLC

(57) ABSTRACT

A stylus pen includes: a first body with a first opening at one end and a second opening at the other end; a stylus tip, at least part of which protrudes from the first opening and has conductivity; a guide portion attached to the second opening and including a through hole; and a conductive member extending through the through hole within the first body, one end of which is attached to the stylus tip, and at least a part of which passes through the through hole and is wider than the diameter of the through hole.

10 Claims, 20 Drawing Sheets

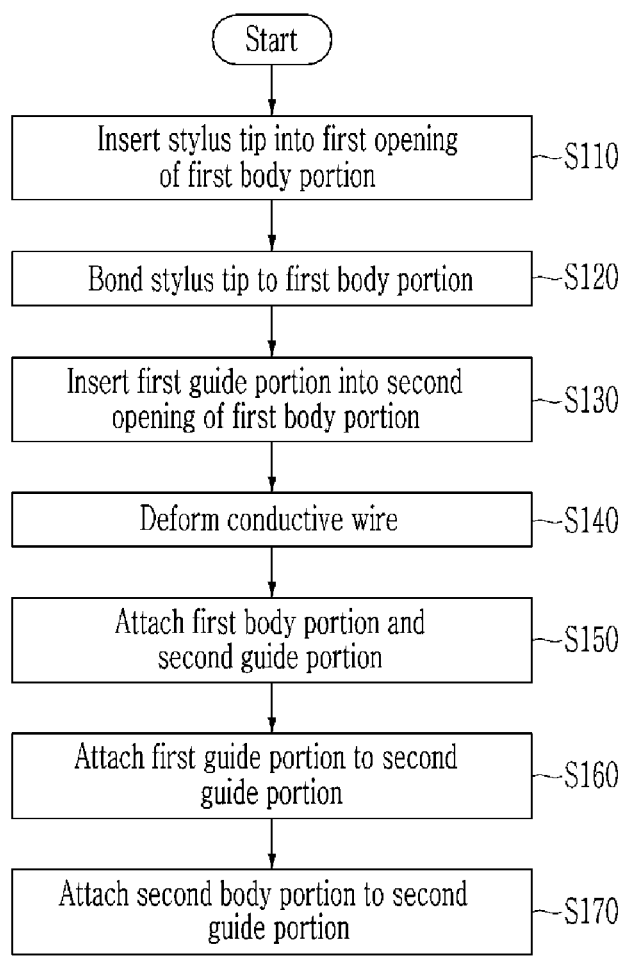

STYLUS PEN AND METHOD FOR MANUFACTURING THE SAME

CROSS-REFERENCE TO RELATED APPLICATION

This application claims priority to and the benefit of Korean Patent Application No. 10-2017-0141345 filed in the Korean Intellectual Property Office on Oct. 27, 2017, the entire contents of which are incorporated herein by reference.

BACKGROUND

(a) Field

The present disclosure relates to a stylus pen and a method for manufacturing the same.

(b) Description of the Related Art

Various mobile terminals such as mobile phones, smartphones, tablet PCs, laptop computers, digital broadcasting terminals, PDAs (Personal Digital Assistants), PMPs (Portable Multimedia Players), and navigation devices come with touch sensors.

Touch sensors in such terminals may be positioned on a display panel that displays images or in an area of the terminal body. The terminal may provide the user with an intuitive user interface, as the user interacts with the terminal by touching the touch sensors.

The user may use a stylus pen for precise touch input. Stylus pens may be divided into active stylus pens and passive stylus pens, depending on whether they include electronic components or not.

FIG. 1 is a view showing a passive stylus pen according to the conventional art. Referring to FIG. 1, a stylus pen 10 includes a bullet-shaped stylus tip 11 and a stylus body 12. The stylus tip 11 is entirely or partially made of a conductive material.

Generally, the user tilts the stylus pen 10 at an angle with respect to a sensing surface 20 when using the stylus pen 10, rather than holding the stylus pen 10 perpendicular to the sensing surface 20. If the user tilts the stylus pen 10 when using it, additional capacitance is formed between the side of the conductive stylus tip 11 and the sensing surface 20. Then, due to the additional capacitance, the largest change in capacitance occurs between a point 21 of contact with the stylus tip 11 and a certain point 22 in the direction in which the stylus pen 10 is tilted. Thus, rather than the point 21 at which the stylus tip 11 makes actual contact with the sensing surface 20, but the point 22 adjacent to the point 21 is detected as a contact point. In this case, an offset 23 (hereinafter referred to as the tilt offset) between the actual point 21 of contact and the actual detected point 22 may be as large as several hundreds of micrometers or more.

As such, when a passive stylus pen according to the conventional art is tilted, a linearity error occurs depending on the tilt of the stylus pen, making precise touch input difficult.

U.S. Pat. No. 9,298,285 discloses a stylus pen for solving this problem.

FIG. 2 and FIG. 3 are views showing the structure of the stylus pen disclosed in U.S. Pat. No. 9,298,285.

In FIG. 2, a stylus pen 30 includes a spherical stylus tip 31 and a conductive member 32 connected to the stylus tip 31. Part of the stylus tip 31 and the conductive member 32 are surrounded and fixed by a holder 33 made of a non-conductive material. The holder 33 is connected to a stylus body 34. According to the structure of the stylus pen 30 illustrated in FIG. 2, the largest change in capacitance occurs at a contact point regardless of the tilt because the spherical stylus tip 31 is used, and the change in capacitance caused by the conductive member 32 can be minimized because the conductive member 32 is made thin. Thus, the tilt offset can be minimized.

However, according to the structure of the stylus pen illustrated in FIG. 2 and FIG. 3, the distance between the grip part and the conductive member 32 is large, which makes the capacitance C1 between the user's hand and the conductive member 32 small and causes the conductive member to float, thereby reducing the touch sensitivity of the stylus tip 31.

The above information disclosed in this Background section is only for enhancement of understanding of the background and therefore it may contain information that does not form the prior art that is already known in this country to a person of ordinary skill in the art.

SUMMARY

Exemplary embodiments provide a stylus pen that reduces tilt offset and a method for manufacturing the same.

Exemplary embodiments provide a stylus pen that increases the touch sensitivity of touch sensors and a method for manufacturing the same.

To achieve the above or other aspects, an exemplary embodiment of the present invention provides a stylus pen including: a first body with a first opening at one end and a second opening at the other end; a stylus tip, at least part of which protrudes from the first opening and has conductivity; a guide portion attached to the second opening and including a through hole; and a conductive member extending through the through hole within the first body, one end of which is attached to the stylus tip, and at least a part of which passes through the through hole and is wider than the diameter of the through hole.

The guide portion may include: a first guide portion including the through hole, a first combining portion formed on part of the outer surface, and a first cavity with a diameter equal to or larger than the width of at least a part of the conductive member; and a second guide portion including a second cavity with the first guide portion inserted therein, a second combining portion formed on the inner surface of the second cavity and attached to the first combining portion, a third combining portion inserted into the second opening, and a fourth combining portion positioned on the opposite side of the third combining portion.

At least a part passing through the through hole may come in contact with an area of the first cavity around the through hole.

The guide portion may have conductivity.

The conductive member may be 1 mm or less in diameter.

The diameter of the stylus tip may be 0.5 mm to 3 mm, and the diameter of the first opening may be smaller than the diameter of the stylus tip.

The stylus pen may further include a second body that is attached to the guide portion on the opposite side of one end to which the second opening is attached.

The stylus pen may further include: a third guide portion attached to the second body on the opposite side of one end to which the guide portion is attached, and electrically connected to the conductive member on the inside; and a third body attached to the third guide portion on the opposite side of one end to which the second body is attached.

The second body may include at least one conductive part electrically connected to the guide portion and exposed on the outer surface of the second body.

A part of the conductive member attached to the stylus tip may have a different shape than the other part of the conductive member so as to keep the conductive member from being separated from the stylus tip.

Another exemplary embodiment of the present invention provides a method for manufacturing a stylus pen, the method including: disposing a conductive member within a molding space through an insertion opening of a mold part; molding a stylus tip at one end of the conductive member by injecting a molten material into the molding space through an inlet of the mold part; demolding a conductive member with the stylus tip attached thereto from the mold part; and inserting the conductive member into a first opening of the first body, wherein the diameter of the first opening is smaller than the diameter of the stylus tip.

The method may further include inserting a first guide portion into a second opening of the first body after the insertion of the conductive member, wherein the first guide portion includes: a through hole into which the conductive member is inserted when the first guide portion is inserted into the second opening; a first cavity; and a first combining portion formed on part of the outer surface.

The method may further include deforming at least a part of the conductive member after the insertion of the first guide portion, wherein the at least a part may be wider than the diameter of the through hole.

The method may further include attaching a second guide portion to the second opening of the first body, wherein the second guide portion includes: a second cavity into which the first guide portion is inserted; a second combining portion formed on the inner surface of the second cavity and attached to the first combining portion; a third combining portion inserted into the second opening; and a fourth combining portion positioned on the opposite side of the third combining portion.

The method may further include attaching the first combining portion of the first guide portion to the second combining portion of the second guide portion so that the at least a part of the conductive member comes in contact with an area of the first cavity around the through hole after the second guide portion is attached to the second opening of the first body.

The method may further include attaching the second body to the fourth combining portion of the second guide portion after the first combining portion of the first guide portion is attached to the second combining portion of the second guide portion.

The demolding of the conductive member with the stylus tip attached thereto from the mold part may include applying pressure to the conductive member in the direction in which the stylus tip is separated from the molding space.

Another exemplary embodiment of the present invention provides a stylus pen including: a stylus tip with conductivity that is 0.5 mm to 3 mm in diameter; a conductive member measuring 20 mm or more in length, with one end attached to the stylus tip; a first guide portion with conductivity that includes a through hole with the conductive member inserted therein and a first combining portion formed on the outer surface; and a second guide portion including an outer surface that can be held by the user, a cavity into which the first guide portion is inserted, and a second combining portion formed on the inside of the cavity and attached to the first combining portion.

At least a part of the conductive member may be wider than the diameter of the through hole.

The distance between the stylus tip and the outer surface may be 20 mm or more.

A stylus pen and a method for manufacturing the same according to the present disclosure has the following advantages.

According to at least one of the exemplary embodiments of the present disclosure, it is possible to accurately detect a contact point of a stylus pen by means of a terminal.

According to at least one of the exemplary embodiments of the present disclosure, it is also possible to provide a more intuitive interface to the user.

Further scope of applicability of the present disclosure will become apparent from the detailed description given hereinafter. However, it should be understood that the detailed description and specific examples, while indicating specific embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

FIG. 6 is a flowchart of a method for manufacturing a stylus pen according to an exemplary embodiment of the present invention.

DETAILED DESCRIPTION OF THE EMBODIMENTS

Figure 1:
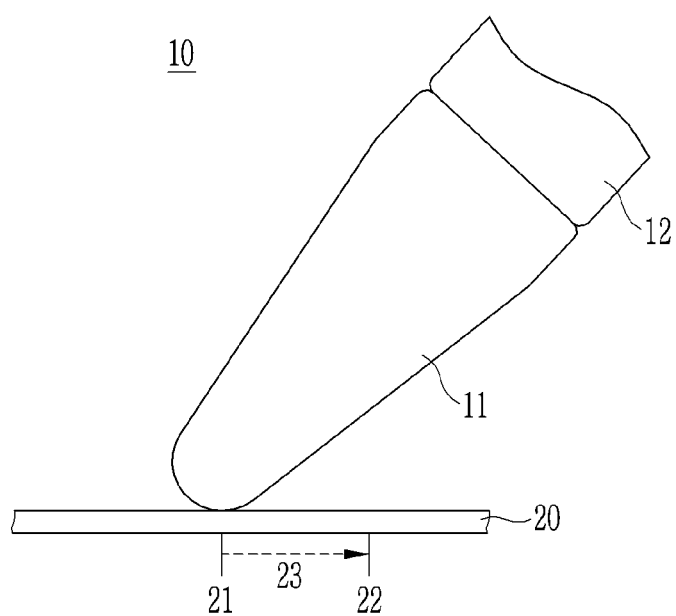
FIG. 1 to FIG. 3 are views showing a stylus pen according to the conventional art.
Figure 2:
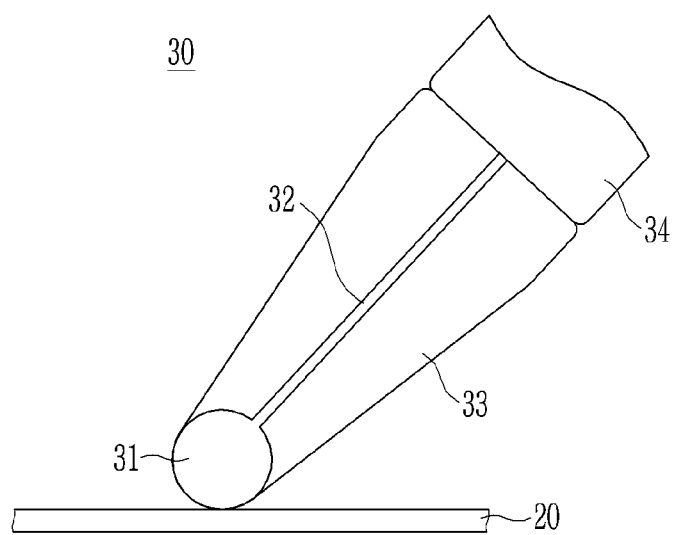
Figure 3:
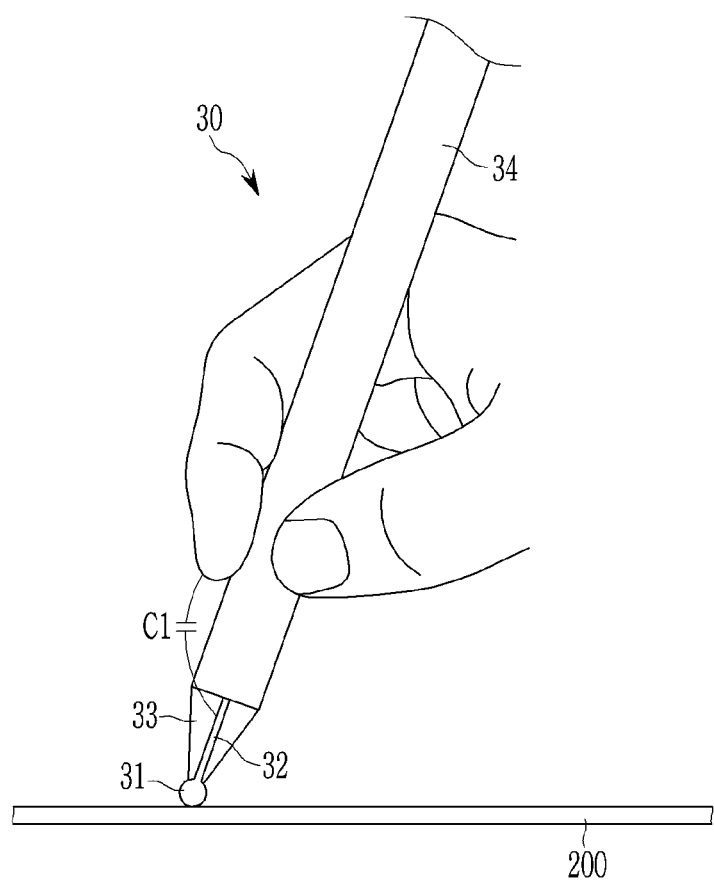

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Figure 4:
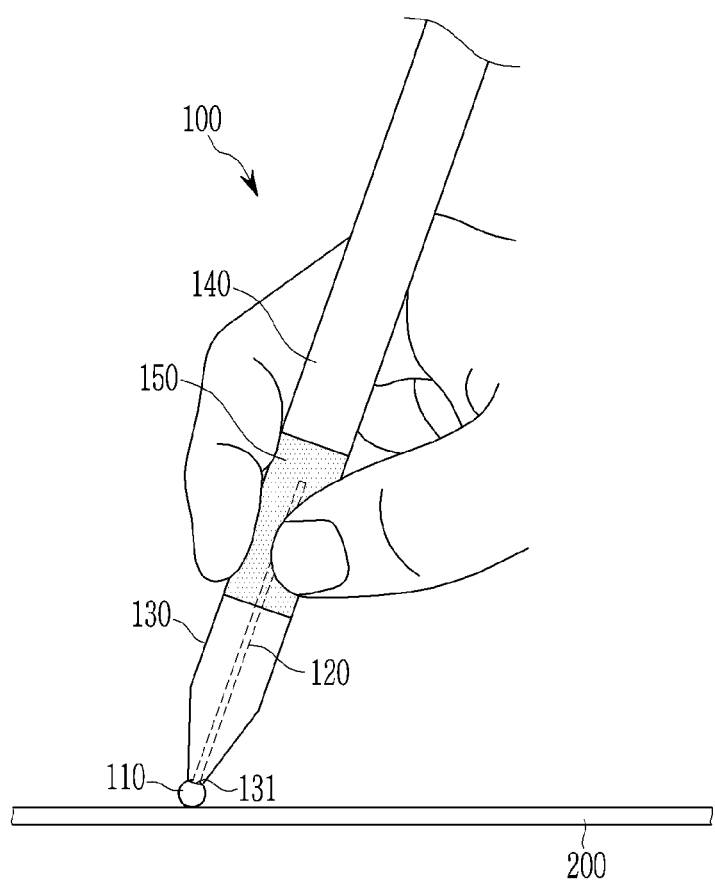
FIG. 4 is a view schematically showing a stylus pen according to an exemplary embodiment of the present invention.

FIG. 4 is a view showing a stylus pen according to an exemplary embodiment of the present invention.

As shown in FIG. 4, a stylus pen 100 according to an exemplary embodiment of the present invention includes a stylus tip 110, a conductive member 120, a first body 130, a second body 140, and a guide portion 150.

The stylus tip 110 may have an overall spherical shape. Part of the stylus tip 110 may have a predetermined curvature (e.g., a hemisphere shape).

The stylus tip 110 may be positioned in a first opening 131 of the first body 130. At least part of the stylus tip 110 includes a conductive material. In this case, the stylus tip 110 preferably has resistance of 10Ω or lower. Also, the diameter of the stylus tip 110 is preferably 0.1 mm to 3 mm, and particularly, 0.5 mm to 2 mm. At least part of the stylus tip 110 protrudes from the first opening 131, and at least part of it is inserted into the first body 130 through the first opening 131. For example, if the diameter of the stylus tip 110 is 2 mm, part of the stylus tip 110 is inserted into the first body 130 through the first opening 131 so that it protrudes 1.2 mm from the first opening 131.

The conductive member 120 is a wire with conductivity that is connected to the stylus tip 110, and may be positioned within the first body 130. The stylus tip 110 and the conductive member 120 may be insert-and-injection molded.

The conductive member 120 may be electrically connected to the guide portion 150 that is to be held by the user. For instance, the conductive member 120 may extend up to the guide portion 140 and make direct contact with the guide portion 150.

The conductive member 120 may be 20 mm or more in length. Also, the conductive member 120 may be 0.1 mm to 1 mm in diameter to minimize the effect of the tilt on sensitivity. The conductive member 120 may have the shape of a cylinder, a polygonal column, a column that is at least partially curved, an entasis, a frustum of a pyramid, a circular truncated cone, and so on, but is not limited to these shapes.

Part of the stylus tip 110 and the conductive member 120 may be disposed within the first body 130. In this case, the stylus tip 110 may be fixed to the first opening 131. Also, the first body 130 is attached to the guide portion 150.

The first body 130 may include a truncated cone and a column that extend from the first opening 131 and combine together. Although the first body 130 is illustrated as an integrated combination of a truncated cone portion and a column portion, the two portions may be separated from each other. The column portion may have the shape of a cylinder, a polygonal column, a column that is at least partially curved, an entasis, a frustum of a pyramid, a circular truncated cone, and so on, but is not limited to these shapes. The first body 130 may be made of a non-conductive material.

The guide portion 150 may include a conductive material. The guide portion 150 may be held by the user. The guide portion 150 may be positioned 20 mm to 70 mm from the stylus tip 110. Preferably, the guide portion 150 to be held by the user may be 10 mm high, and be positioned 20 mm to 40 mm from the stylus tip 110.

The outer surface of the guide portion 150 may have the shape of a cylinder, a polygonal column, a column that is at least partially curved, an entasis, a frustum of a pyramid, a circular truncated cone, and so on, but is not limited to these shapes.

The guide portion 150 may be electrically connected to the conductive member 120. The connection between the conductive member 120 and the guide portion 150 may be established in various ways. Then, the stylus tip 110, the conductive member 120, and the guide portion 150 may be electrically connected. When the stylus tip 110 approaches a sensing surface 200 while the guide portion 150 is being held by the user, an electric charge is transferred to the user from the stylus tip 110 through the conductive member 120 and the guide portion 150, thereby further increasing the touch sensitivity of the stylus tip 110.

The second body 140 is attached to the guide portion 150. The outer surface of the second body 140 may have the shape of a cylinder, a polygonal column, a column that is at least partially curved, and so on, but is not limited to these shapes. The second body 140 may be made of a non-conductive material.

Next, referring to FIG. 5, a stylus pen 100 according to an exemplary embodiment will be described in detail.

Figure 5:
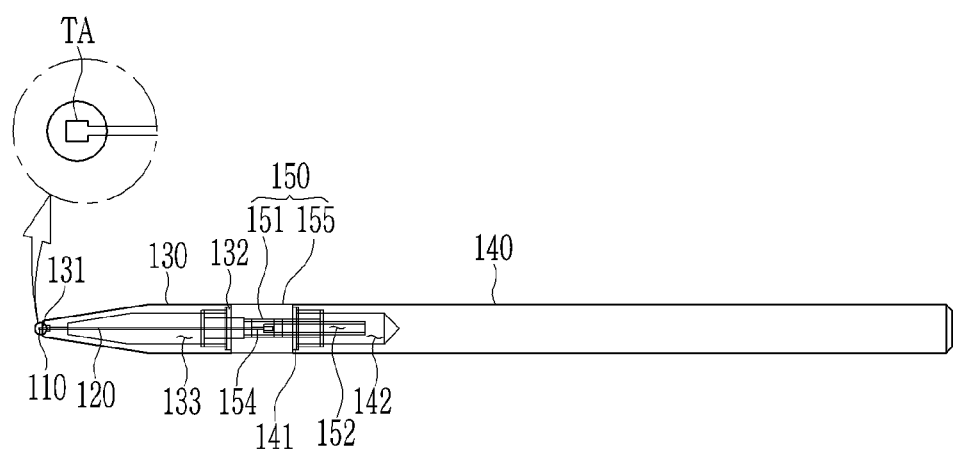
FIG. 5 is a view showing a detailed structure of a stylus pen according to an exemplary embodiment of the present invention.

FIG. 5 is a view showing a detailed structure of a stylus pen according to an exemplary embodiment of the present invention.

As shown in FIG. 5, the stylus pen 100 includes a stylus tip 110, a conductive member 120, a first body 130, a second body 140, and a guide portion 150.

The stylus tip 110 is attached to the conductive member 120. At least a part TA of the conductive member 120 in the stylus tip 110 that is attached to the stylus tip 110 is deformed. For example, the width (or thickness or diameter) of at least a part TA of the conductive member 120 in the stylus tip 110 that is attached to the stylus tip 110 is larger than the width (or thickness or diameter) of the conductive member 120. Alternatively, at least a part TA of the conductive member 120 in the stylus tip 110 that is attached to the stylus tip 110 may be bent in the shape of a hook. This may prevent the conductive member 120 from being separated from the stylus tip 110. A part TA of the conductive member 120 may be deformed by press molding and various other molding methods.

Part of the stylus tip 110 may be positioned in a first opening 131 of the first body 130. The conductive member 120 may extend from the stylus tip 110 and be positioned in the first opening 131 and a cavity 133 of the first body 130.

The first opening 131 is positioned at one end of the first body 130, and a second opening 134 is positioned at the other end. The cavity 133 may be positioned between the first opening 131 and the second opening 134. The first body 130 is attached to the guide portion 150.

The guide portion 150 may include a first guide portion 151 and a second guide portion 155. The first guide portion 151 may be electrically connected to the conductive member 120. The first guide portion 151 may make direct contact with the conductive member 120.

The conductive member 120 may be positioned in a through hole 154 of the first guide portion and a cavity 152 of the first guide portion 150. At least a part PA of the conductive member 120, positioned in the cavity 152 of the first guide portion 151, is deformed. The following description will be given on the assumption that a part of the conductive member 120 is an end PA of the conductive member 120.

The first guide portion 151 is attached to the second guide portion 155. In the second opening 134 of the first body 130, the second guide portion 155 may be attached to the first body 130. For example, the second guide portion 155 may be inserted into and attached to the second opening 134 of the first body 130. Also, part of the first guide portion 151 may be positioned in the cavity 142 of the second body 140.

The second guide portion 155 is attached to the second body 140. In an opening 141 of the second body 140, the second guide portion 155 may be attached to the second body 140. For example, the second guide portion 155 may be inserted into and attached to the opening 141 of the second body 140.

Next, a method for manufacturing a stylus pen 100 according to an exemplary embodiment will be described with reference to FIGS. 6 to 11.

Figure 7A:
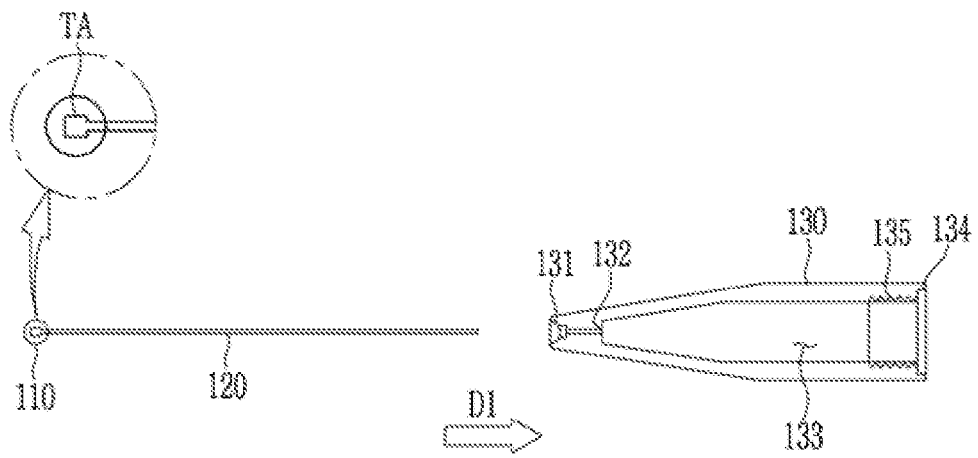
FIGS. 7(a) and 7(b) are views showing part of a stylus pen manufactured according to the method of FIG. 6.
Figure 7B:
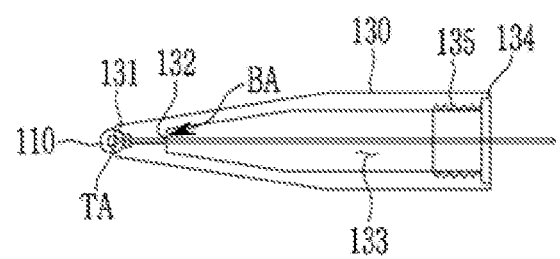
Figure 11:
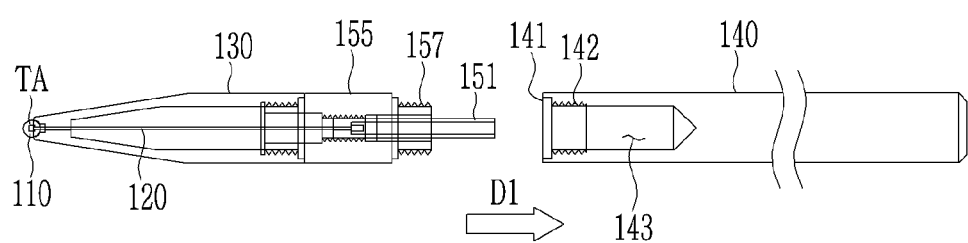

FIG. 6 is a flowchart of a method for manufacturing a stylus pen 100 according to an exemplary embodiment of the present invention, and FIG. 7 and FIG. 11 are views showing part of a stylus pen 100 manufactured according to the method of FIG. 6.

Referring to FIG. 6, a stylus tip 110 and a conductive member 120 are inserted into a first opening 131 of a first body 130 (S110), and the stylus tip 110 is bonded to the first body 130 (S120). The steps S110 and S120 will be described with reference to FIG. 8.

As shown in (a) of FIG. 7, the first body 130 includes a first opening 131, a through hole 132, a cavity 133, a second opening 134, and a combining portion 135. The conductive member 120 connected to the stylus tip 110 may be inserted into the first opening 131 in a first direction D1. The conductive member 120 may be inserted into the first body 130 so that the stylus tip 110 makes contact with the first opening 131.

Then, as shown in (b) of FIG. 7, the conductive member 120 may be positioned in the through hole 132, the cavity 133, and the second opening 134. When the stylus tip 110 makes contact with the first opening 131, the conductive member 120 may be bonded to at least a part BA of the through hole 132 and the cavity 133 by injecting a bonding agent or the like through the cavity 133.

Next, the first guide portion 151 is inserted into the second opening 134 of the first body 130 (S130). The step S130 will be described with reference to FIG. 8.

Figure 8A:
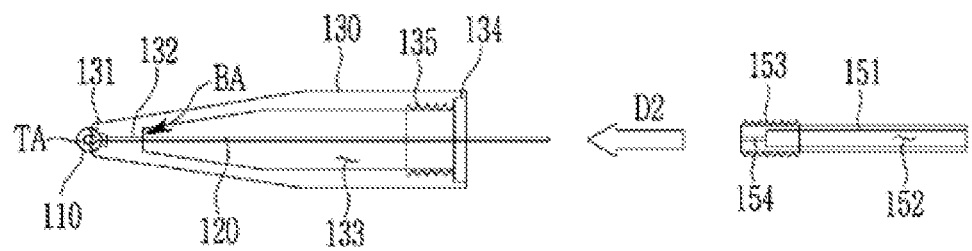
FIGS. 8(a) and 8(b) and FIG. 9 are views showing part of a stylus pen manufactured according to the method of FIG. 6.
Figure 8B:
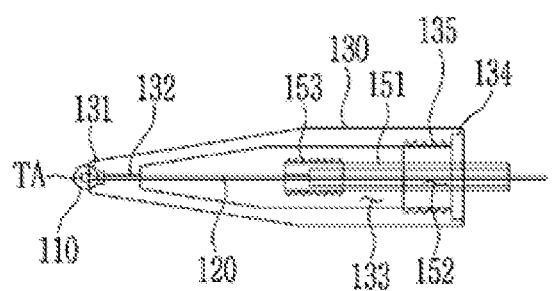

As shown in (a) of FIG. 8, the first guide portion 151 includes the through hole 154, the cavity 152, and a combining portion 153. The first guide portion 151 may be inserted into the cavity 152 of the first body 130 through the second opening 134. In this case, the conductive member 120 may be inserted into the through hole 154 of the first guide portion 151.

Then, as shown in (b) of FIG. 8, the conductive member 120 may be positioned in the through hole 154 and the cavity 152 of the first guide portion 151. Next, an end TA of the conductive member 120 is deformed (S140).

Figure 9:
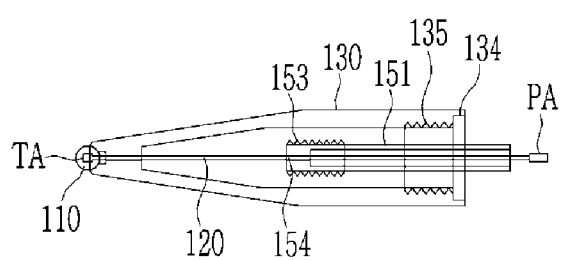
Figure 10A:
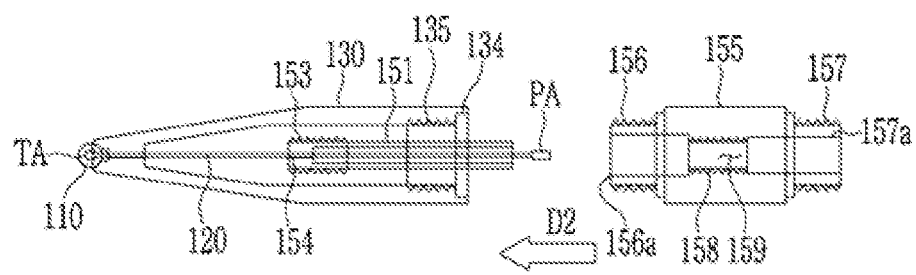
FIGS. 10(a) and 10(b) and FIG. 11 are views showing part of a stylus pen manufactured according to the method of FIG. 6.
Figure 10B:
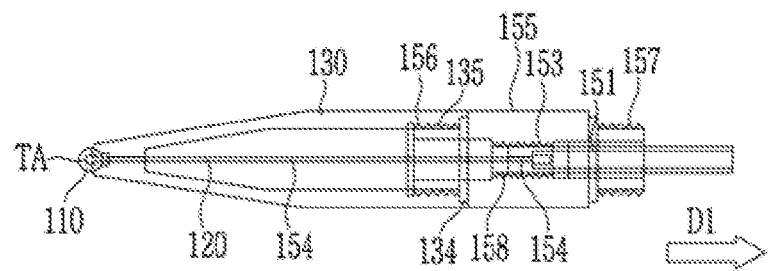

As shown in FIG. 9, one end TA of the conductive member 120 may be deformed while the conductive member 120 is inserted in the first guide portion 151. The end TA of the conductive member 120 may be deformed by press molding and various other molding methods.

The width (or thickness or diameter) of the end TA may be larger than at least the diameter of the through hole 154. Alternatively, the end TA may be bent in the shape of a hook. This keeps the end TA of the conductive member 120 from passing through the through hole 154, thereby preventing the first guide portion 151 from being separated from the conductive member 120.

While the end TA of the conductive member 120 is deformed in the above description, the middle part of the conductive member 120 may be deformed depending on the way the conductive member 120 and the through hole 154 of the first guide portion 151 are attached, and the deformed position is not limited in the present invention.

Next, the first body 130 and the second guide portion 155 are attached (S150). The second guide portion 155 includes a first opening 156a, a second opening 157a, a first combining portion 156, a second combining portion 157, a third combining portion 158, and a cavity 159. As shown in (a) of FIG. 10, the second guide portion 155 may be attached to the combining portion 135 of the first body 130. For example, the second guide portion 155 may be inserted into the first opening 156 in a second direction D2. The first combining portion 156 of the second guide portion 155 may be screwed to the combining portion 135 of the first body 130.

In this case, the first guide portion 151 may be inserted into the cavity 159 through the first opening 156a of the second guide portion 155. The diameter of the first guide portion 151 is smaller than the diameter of the cavity 159.

After the first guide portion 151 is inserted into the cavity 159 of the second guide portion 155, the first guide portion 151 is attached to the second guide portion 155 (S160). The third combining portion 158 is formed inside the cavity 159 of the second guide portion 155. The combining portion 153 of the first guide portion 151 may be attached to the third combining portion 158 of the second guide portion 155. For example, the third combining portion 158 of the second guide portion 155 may be screwed to the combining portion 153 of the first guide portion 151.

In this case, the first guide portion 151 may be attached to the third combing portion 158 of the second guide portion 155 so as to protrude as much as possible in the first direction D1. The first guide portion 151 may protrude as much as possible in the first direction D1 until the end PA of the conductive member 120 makes contact with the entrance of the through hole 154. Then, the conductive member 120 may make contact with the first guide portion 151. As the first guide portion 151 is attached to the third combining portion 158 of the second guide portion 155, the conductive member 120 may be fixed while in contact with the first guide portion 151.

Next, the second body 140 is attached to the second guide portion 155 (S170). As shown in FIG. 11, the second body 140 includes an opening 141, a cavity 143, and a combining portion 142. A combined structure of the stylus tip 110, the conductive member 120, the first guide portion 151, and the second guide portion 155 may be inserted into the opening 141 of the second body 140 in the first direction D1. Then, the first guide portion 151 may be inserted into the cavity 143 of the second body 140. Also, the second combining portion 157 of the second guide portion 155 may be attached to the combining portion 142 of the second body 140. For example, the second combining portion 157 of the second guide portion 155 is screwed to the combining portion 142 of the second body 140.

In the stylus pen 100 manufactured according to the above method, the stylus tip 110, the conductive member 120, the first guide portion 151, and the second guide portion 155 are electrically connected. The user may use the stylus pen 100 by holding the second guide portion 155 which is externally exposed. As an electrical charge transferred by touch electrodes in response to a driving signal may be in sync with the user's hand in the ground state via the stylus pen 100, the stylus pen 100 according to the exemplary embodiment may provide improved touch sensitivity to the user In addition, the tilt offset of the stylus pen 100 may be improved since the conductive member 120 is smaller in diameter than the stylus tip 110.

Next, referring to FIG. 12, a stylus pen according to another exemplary embodiment will be described.

Figure 12:
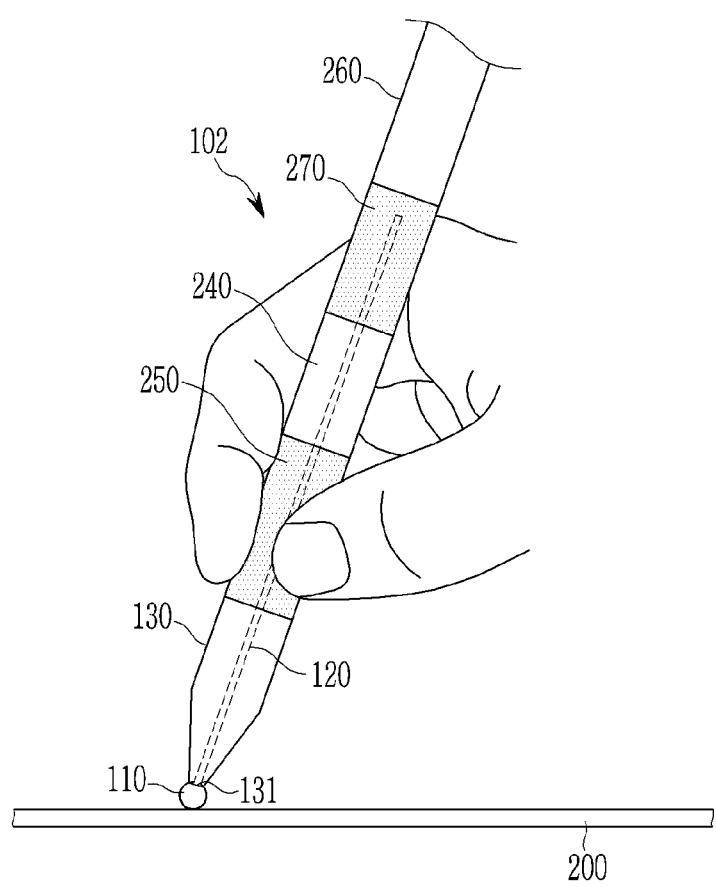
FIG. 12 is a view schematically showing a stylus pen according to another exemplary embodiment of the present invention.

FIG. 12 is a view schematically showing a stylus pen 102 according to another exemplary embodiment of the present invention.

As shown in FIG. 12, the stylus pen 102 according to another exemplary embodiment of the present invention includes a stylus tip 110, a conductive member 120, a first body 130, a guide portion 250, a second body 240, a guide portion 270, and a third body 260.

The stylus pen 102 of FIG. 12 is mostly similar to the stylus pen 100 of FIG. 4, but it further includes the guide portion 270 and the third body 260, as compared to the stylus pen 100, and the conductive member 120 extends up to the guide portion 270. Thus, these differences alone will be described.

The guide portion 270 may include a conductive material. The guide portion 270 may come in contact with part of the user's hand when the guide portion 270 is held by the user. Alternatively, the guide portion 270 may be held directly by the user.

The outer surface of the guide portion 270 may have the shape of a cylinder, a polygonal column, a column that is at least partially curved, and so on, but is not limited to these shapes.

The guide portion 270 may be electrically connected to the conductive member 120. The connection between the conductive member 120 and the guide portion 270 may be established in various ways. Then, the stylus tip 110, the conductive member 120, the guide portion 250, and the guide portion 270 may be electrically connected. When the stylus tip 110 approaches the sensing surface 200 while the user's hand is in contact with the guide portion 270 or the guide portion 270 is being held by the user, an electric charge is transferred to the user from the stylus tip 110 through the conductive member 120 and the guide portion 270, thereby further increasing the touch sensitivity of the stylus tip 110.

The third body 260 is attached to the guide portion 270. The outer surface of the third body 260 may have the shape of a cylinder, a polygonal column, a column that is at least partially curved, and so on, but is not limited to these shapes. The third body 260 may be made of a non-conductive material.

Figure 13:
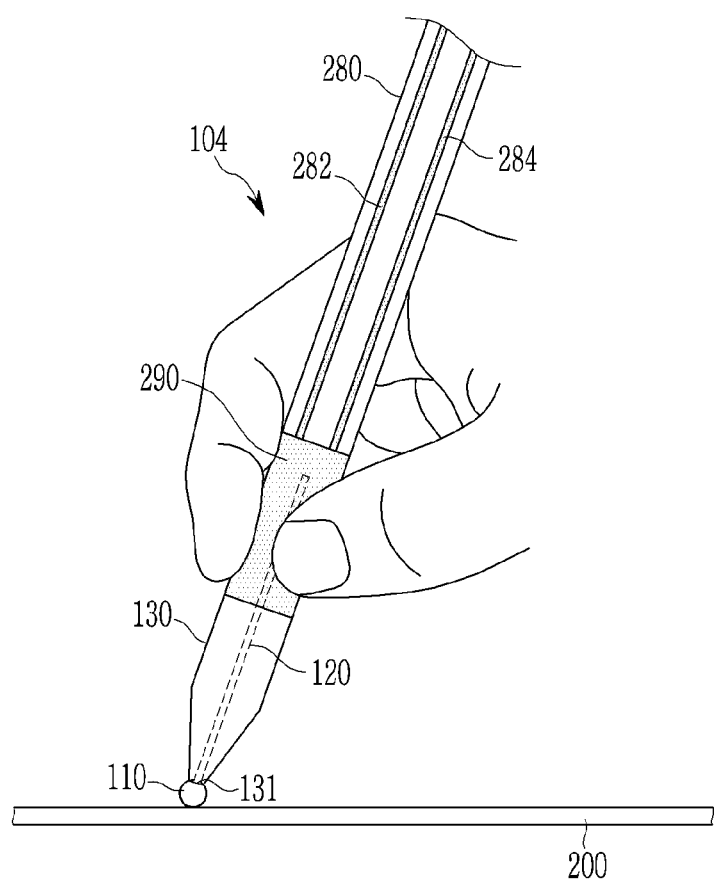
FIG. 13 is a view schematically showing a stylus pen according to yet another exemplary embodiment of the present invention.

FIG. 13 is a view schematically showing a stylus pen 104 according to yet another exemplary embodiment of the present invention.

As shown in FIG. 13, the stylus pen 104 according to yet another exemplary embodiment of the present invention includes a stylus tip 110, a conductive member 120, a first body 130, a guide portion 290, and a second body 280.

The stylus pen 104 of FIG. 13 is mostly similar to the stylus pen 100 of FIG. 4, but the second body 280 includes at least one conductive part (282 and 284). Thus, this difference alone will be described.

The second body 280 is attached to the guide portion 290. The outer surface of the second body 280 may have the shape of a cylinder, a polygonal column, a column that is at least partially curved, and so on, but is not limited to these shapes. The second body 280 may be formed from a non-conductive material and have at least one conductive part (282 and 284).

The at least one conductive part (282 and 284) may extend along the length of the stylus pen 104 or may be formed from one conductor. The at least one conductive part (282 and 284) may have a mesh pattern.

The at least one conductive (part 282 and 284) is exposed on the outer surface of the second body 280. By extending the conductive member 120 up to the second body 280, the at least one conductive part (282 and 284) may make contact with the conductive member 120 within the second body 280.

By attaching the second body 280 to the guide portion 290, the at least one conductive part (282 and 284) may make contact with the guide portion 290. Accordingly, the at least one conductive part (282 and 284) may be electrically connected to the guide portion 290.

Then, when the stylus tip 110 approaches the sensing surface 200 while the user's hand is in contact with the second body 280 or the second body 280 is being held by the user, an electric charge is transferred to the user from the stylus tip 110 through the conductive member 120, the guide portion 290, and the conductive parts (282 and 284) and sync with the user's hand, thereby further increasing the touch sensitivity of the stylus tip 110.

Next, a method for manufacturing the above-described stylus tip 110 and the conductive member 120 attached to it will be further described with reference to FIGS. 14 to 20. The steps for manufacturing the stylus tip may be performed prior to the step S110.

Figure 14:
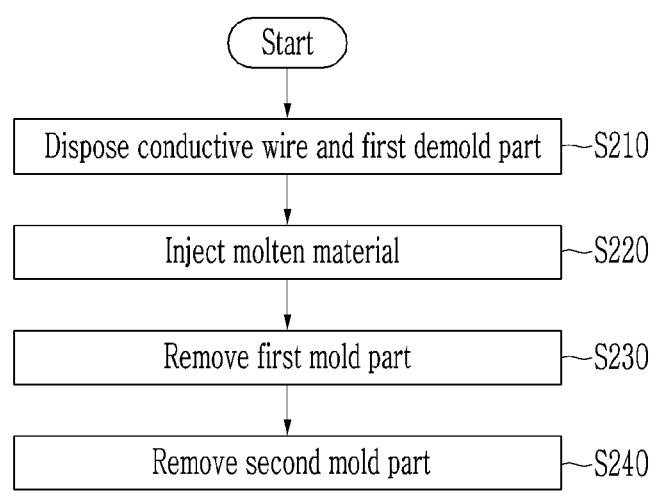
FIG. 14 is a view showing a method for manufacturing part of a stylus pen according to an exemplary embodiment of the present invention.

FIG. 14 is a view showing a method for manufacturing part of a stylus pen according to an exemplary embodiment of the present invention, and FIG. 15 to FIG. 20 are views showing part of the stylus pen manufactured according to the method of FIG. 14.

Referring to FIG. 14, first of all, a conductive member 120 and a first demold part 340 are disposed in a molding space (311 and 312) of a manufacturing apparatus 300 (S210).

Figure 15:
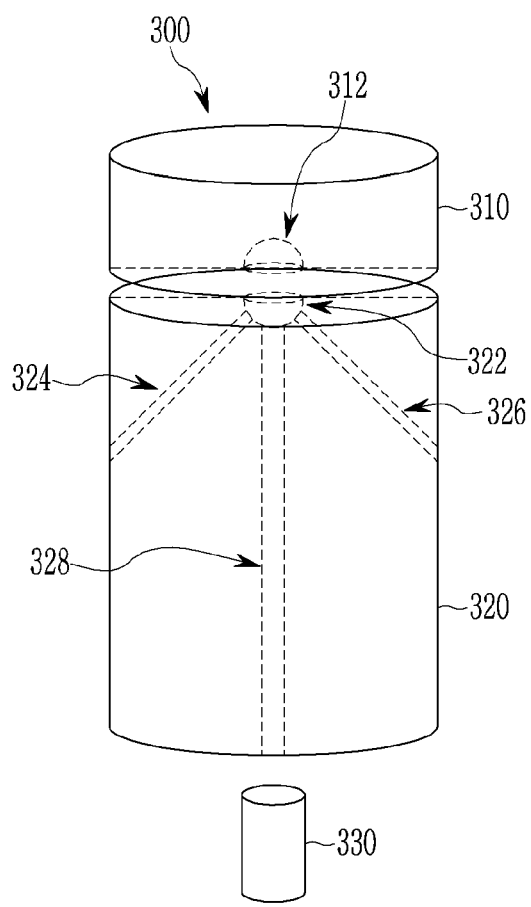
FIG. 15 to FIG. 20 are views showing part of the stylus pen manufactured according to the method of FIG. 14.

As shown in FIG. 15, the manufacturing apparatus 300 includes a first mold part 310 and a second mold part 320. A first cavity 312 is formed inside the first mold part 310, and a second cavity 322 is formed inside the second mold part 320. When the first mold part 310 and the second mold part 320 are attached, the first cavity 312 and the second cavity 322 may form the molding space (311 and 312). The molding space (311 and 312) may correspond in shape to the stylus tip 110, and is illustrated to have an overall spherical shape in the figures below.

An inlet 326 for injecting a molten material 350, a first insertion opening 328 for inserting the conductive member 120, and a second insertion opening 324 for inserting the first demold part 340, are formed in the second mold part 320.

Figure 16:
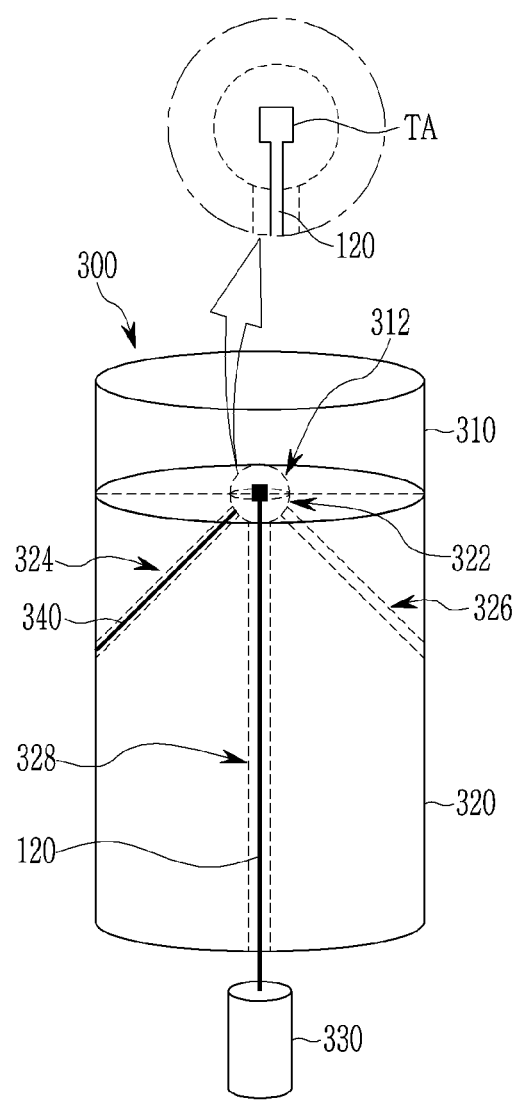

As shown in FIG. 16, in the step S210, the conductive member 120 is inserted through the first insertion opening 328, and one end of it may be positioned within the molding space (311 and 312). In this case, one end of the conductive member 120 positioned within the molding space (311 and 312) may be deformed in shape. Also, the other end of the conductive member 120 may be supported by a second demold part 330.

The first demold part 340 may be inserted through the second insertion opening 324 and positioned in the boundary between the molding space (311 and 312) and the second insertion opening 324. The first demold part 340 may prevent the molten material 350 from spilling out of the molding space (311 and 312) through the second insertion opening 324.

The molten material 350 is injected (S220). The molten material 350 includes a molten metal, a resin composition, etc. In this case, the molten metal and the resin composition may be a molten material 350 formed from a material that becomes conductive after being cooled.

Figure 17:
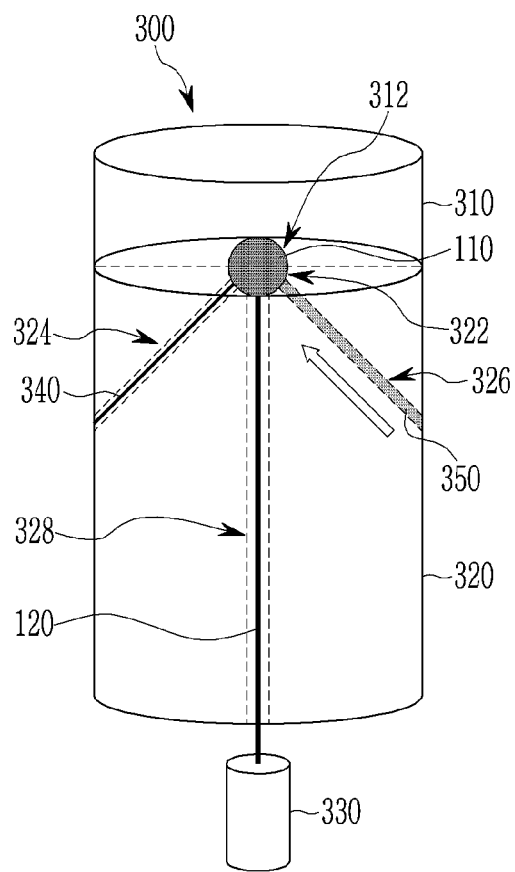

As shown in FIG. 17, the molten material 350 may be injected through the inlet 326 and fill in the molding space (311 and 312). As the molten material 350 injected into the molding space (311 and 312) is cooled, the molten material 350 may solidify and fuse onto the conductive member 120 within the molding space (311 and 312).

Figure 18:
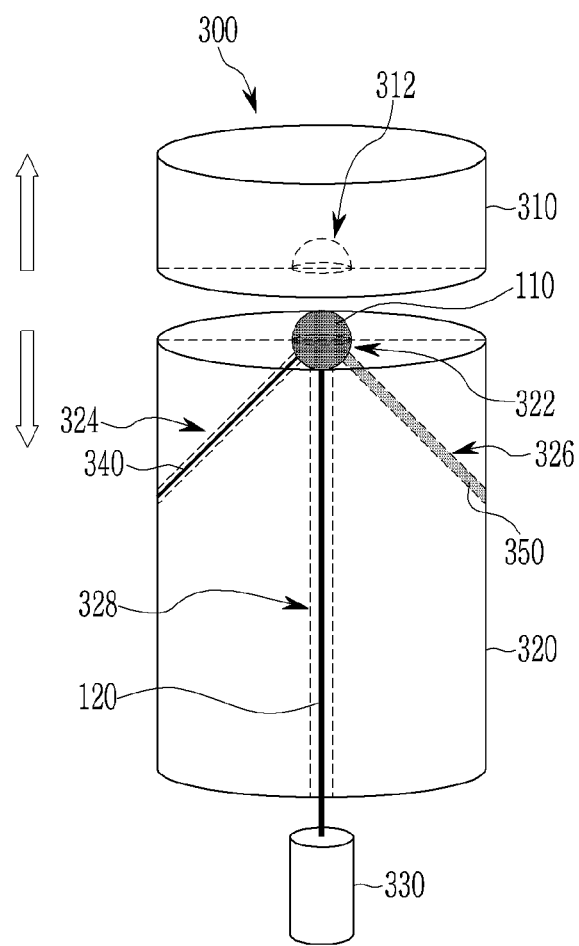

When cooling is complete, the first mold part 310 is removed (S230). As shown in FIG. 18, the first mold part 310 and the second mold part 320 may be moved in opposite directions, or the first mold part 310 may be removed by separating it from the second mold part 320.

Figure 19:
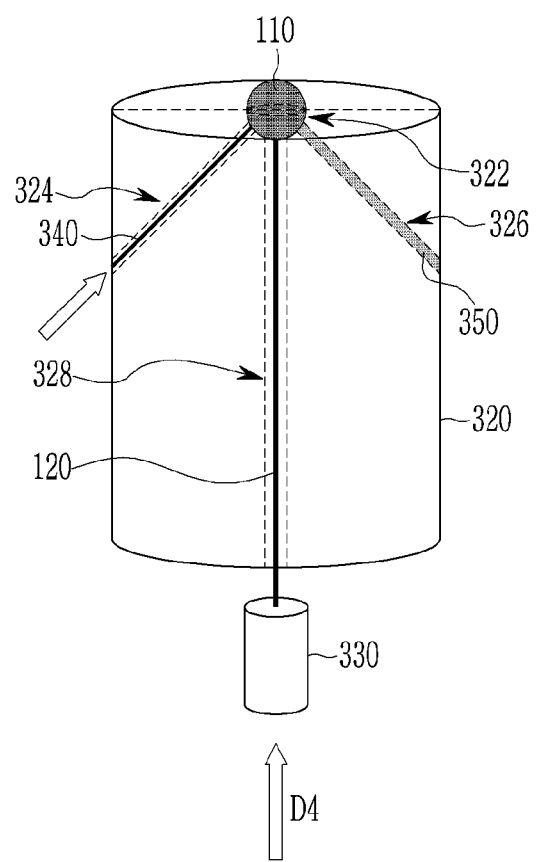
Figure 20:
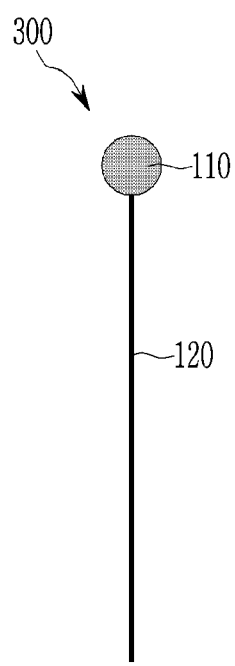

Next, the second mold part 320 is removed (S240). If a force is applied to the first demold part 340 in a direction D3 and a force is applied to the second demold part 330 in a direction D4, as shown in FIG. 19, the stylus tip 110 may be demolded from the second cavity 322 as shown in FIG. 20. That is, the stylus tip 110 applies pressure to the first demold part 340 and the second demold part 330 in the direction in which it is separated from the molding space (311 and 312), thereby demolding the stylus tip 110. Surface treatment may be performed on the surface of the stylus tip 110.

In the injection molding method described above, the stylus tip 110 and the conductive member 120 may combine in such a way that the conductive member 120 is inserted into the stylus tip 110. The combined body of the stylus tip 110 and the conductive member 120, which is formed by the above injection molding method, may have improved durability, reducing concern about separation or damage due to external impact. Another advantage is that mass production is possible at low production costs, as compared with other methods of combining the stylus tip 110 and the conductive member 120.

The foregoing detailed description should not be construed as restrictive in all aspects but is to be considered as illustrative. The scope should be determined by reasonable interpretation of the appended claims, and all changes that come within the equivalent scope are included in the scope.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A stylus pen comprising:
   a first body with a first opening at one end and a second opening at the other end;
   a stylus tip, at least part of which protrudes from the first opening and has conductivity;
   a guide portion attached to the second opening and comprising an outer surface exposed outside for user's grip and a through hole; and
   a conductive member extending through the through hole within the first body, one end of which is attached to the stylus tip, and at least a part of which passes through the through hole and is wider than the diameter of the through hole,
   wherein the at least a part is located inside the guide portion and directly connected with the guide portion.

2. The stylus pen of claim 1, wherein
   the guide portion comprises:
   a first guide portion comprising the through hole, a first combining portion formed on part of the outer surface, and a first cavity with a diameter equal to or larger than the width of at least a part of the conductive member; and
   a second guide portion comprising a second cavity with the first guide portion inserted therein, a second combining portion formed on the inner surface of the second cavity and attached to the first combining portion, a third combining portion inserted into the second opening, and a fourth combining portion positioned on the opposite side of the third combining portion.

3. The stylus pen of claim 2, wherein at least a part passing through the through hole comes in contact with an area of the first cavity around the through hole.

4. The stylus pen of claim 1, wherein the guide portion has conductivity.

5. The stylus pen of claim 1, wherein the conductive member is 1 mm or less in diameter.

6. The stylus pen of claim 1, wherein
   the diameter of the stylus tip is 0.5 mm to 3 mm, and
   the diameter of the first opening is smaller than the diameter of the stylus tip.

7. The stylus pen of claim 1, further comprising a second body that is attached to the guide portion on the opposite side of one end to which the second opening is attached.

8. The stylus pen of claim 7, further comprising:
   a third guide portion attached to the second body on the opposite side of one end to which the guide portion is attached, and electrically connected to the conductive member on the inside; and
   a third body attached to the third guide portion on the opposite side of one end to which the second body is attached.

9. The stylus pen of claim 7, wherein the second body comprises at least one conductive part electrically connected to the guide portion and exposed on the outer surface of the second body.

10. The stylus pen of claim 1, wherein some part of the conductive member attached to the stylus tip has a different shape than the other part of the conductive member so as to keep the conductive member from being separated from the stylus tip.

* * * * *